United States Patent Office 2,767,046
Patented Oct. 16, 1956

2,767,046

METHOD OF SOLUBILIZING AND RECOVERING METAL VALUES BY MEANS OF AMMONIUM ACID SULFATE

Robert J. Piros, Jr., Lakeland, Fla., assignor, by mesne assignments, to the United States of America as represented by the United States Atomic Energy Commission No Drawing. Application April 22, 1953, Serial No. 350,520

10 Claims. (Cl. 23—14.5)

This invention relates to the recovery of metal values from compositions containing the same. More particularly it relates to the recovery of uranium, phosphate and aluminum values. Still more particularly it relates to the recovery of high purity alumina from phosphate bearing ores such as the leached zone layer and the phosphate matrix layer found in the Florida Pebble Phosphate Field.

Present in such ores are clays consisting of aluminum phosphates, aluminum silicates, pseudo-wavellite and the like. Methods for treatment of such clays usually have involved treatment in an aqueous slurry form such as the treatment disclosed in the Buchner Patent No. 1,493,320. In such a process after digestion in an aqueous medium the resultant slurry is added to an excess of hot saturated solution of ammonium sulfate, the mixture filtered and then cooled. Upon cooling ammonium alum precipitates.

Such processes have a number of serious drawbacks. Operating costs are high for fuel required for the various heating and evaporation steps necessary to product recovery. Material costs are high due to unavoidable losses of ammonia and ammonium sulfate.

It is a primary object of this invention to overcome the shortcomings and disadvantages of processes heretofore in use.

It is another object of this invention to provide a method of substantially completely solubilizing aluminum values.

It is a further object of this invention to provide a process wherein the sulfate not lost as gypsum is recycled in the process as a sulfate of ammonia.

These and other objects will be apparent to those skilled in the art from the following description:

In carrying out the process of the instant invention a reaction is effected between solid phosphate and aluminum bearing materials and molten sulfates of ammonia. Treatment in the molten state either with ammonium acid sulfate directly, or after mol ratio alteration by addition of sulfate ions prior to addition of the clay, for a time predeterminable for complete reaction gives a molten or fused mass which is then cooled and leached with an aqueous medium to form an extract containing metal values and phosphate in a soluble form. This aqueous solution is then treated to recover one or more of the metal values independently.

The solid reaction may be carried out by intimately mixing, for example, leached zone material with ammonium acid sulfate and heating the mixture to a molten state. The preferred mode of operation is to melt the recycled ammonium acid sulfate, add the makeup sulfate and then add the aluminum bearing material to the molten bath. It will be recognized that a satisfactory operation may be effected utilizing various sulfates of ammonia varying in mol ratio of $NH_3$ to $SO_4$ from 2 to 1 to about 1 to 2. Various sulfates of ammonia may be used in the molten bath, i. e., ammonium sulfate, mixtures of ammonium sulfate with ammonium acid sulfate and/or mixtures adjusted as to mol ratio of $NH_3$ to $SO_4$ of less than 1. Ammonium sulfate if used directly will give up one mol of ammonia and produce one mol of ammonium acid sulfate for each mol of ammonium sulfate present.

A molten bath of ammonium acid sulfate may be maintained in optimum reaction conditions when kept at a temperature between about 350° F. and about 900° F. with a temperature in the range of about 500° F. to 650° F. being preferred. After an aluminum bearing clay or like material is added to the molten bath the mixture is maintained molten for from about 1 to 24 hours, depending upon the temperature and upon the character of the clay in order to effect substantially complete reaction.

The amount of ammonium acid sulfate necessary to complete the reaction is the amount which is the stoichiometric amount calculated to react with all of the calcium bearing and metal bearing constituents of the said material. In practice it has been found advisable to utilize quantities constituting an excess of between 100 and 300 percent. Such excess of course is not lost but is recovered in subsequent stages of processing and recycled to the solubilizing step heretofore described.

Reacted molten material is cooled or simply allowed to solidify. Preferably the molten mass is hit with a cooling stream of water in order to shatter the material into small particles rather than to form solidified large masses which would require the use of heavy duty grinding apparatus to prepare the solidified mass for the subsequent extraction step.

Solidified material is extracted with an aqueous medium preferably in a counter-current leaching system of about 4 stages to produce an extract of a specific gravity in the range of about 1.2 to 1.5 and preferably in the range of about 1.3 to 1.4.

Such an extract when prepared from reacted leached zone material will contain uranium, iron, aluminum and phosphate as soluble constituents. The extract before filtering will be in slurry form containing insoluble calcium sulfate and other material. Such an extraction is carried out at temperatures in excess of about 90° C. until completion of the filtration operation.

The extract of dissolved material is then subjected to an alum crystallization operation. This crystallization may be brought about depending upon the excess of ammonium acid sulfate utilized for the solubilizing step in one or two ways. If sufficient excess were added initially then a solution having a specific gravity of between about 1.2 and 1.5 upon cooling below 90° C. and preferably to a temperature in the range of −10° C. to 40° C. will throw out of solution ammonium alum crystals. If the initial excess of sulfate ion was small then sulfate may be added at this stage in the form of ammonium sulfate and/or ammonium acid sulfate which addition of sulfate of ammonia will cause the precipitation or crystallization of ammonium alum crystals in cooled solution.

Maximum yields in the crystallization of ammonium alum will depend upon the proper correlation of time, temperature, specific gravity of the solution and the concentrations of ammonia and sulfate ions in solution. It has been found that a batch crystallizing time of about 20 minutes to 20 hours is satisfactory, longer times favoring the higher purity and recovery of alum crystals. In plant operations a crystallizing period of between about 2 and 4 hours is normally used. In order to effect a substantially complete removal of aluminum as ammonium alum, temperatures as low as economically possible are utilized with about 20° C. temperature adapted for plant operation.

Solutions having a specific gravity of about 1.4 give a slightly higher recovery of ammonium alum but at the same time present a more difficult filtering problem due to the increase in viscosity of the solution. Solutions of specific gravity substantially less than 1.3 give a lower overall $Al_2O_3$ recovery in the form of an alum.

This discussion of precipitation is premised on the assumption that there is a proper balance of aluminum and sulfate ions. This balance requires that the quantities of sulfate should be in excess of that required to combine with the $Al_2O_3$ to give aluminum sulfate. Preferably the $Al_2O_3$ to sulfate should approach a mol ratio of about 1 to 6. Adjustment of the solution to give a desired mol ratio may be made with $H_2SO_4$, ammonium acid sulfate, ammonium sulfate or mixtures thereof. Crystallization at mol ratios less than 1 to 3 give progressively poorer recovery.

Mol ratios of $Al_2O_3$ to $P_2O_5$ have a significant effect upon the alum recovery and $Al_2O_3$ to $P_2O_5$ mol ratio in the extract of about 2.5 to 1 is preferred. Increasing this mol ratio gives higher total alum recovery. A secondary factor in alum recovery is speed of crystallization. It is normally preferred to cool the liquor for alum crystallization from about 65° C. to about 35° C. at a slow rate over several hours. The longer and preferred crystallization time of 12 hours gives an acceptable purity but nevertheless crude precipitation of alum crystals. Continuous or batch crystallization may be used but the latter is preferred where crystal purity is the determining factor.

Crude alum crystals are handled on a pan or drum filter and the crystals are normally subjected to a second crystallization in order to obtain better purity. In this second crystallization conditions are maintained to eliminate as much of the $P_2O_5$, $Fe_2O_3$ and other undesirable constituents so as to form an alumina hydrate suitable for conversion to alumina of a grade which is useful in the production of aluminum metal. Generally the alum crystals initially separated from the alum crystallizer are redissolved with wash water or with about a 5% to 20% solution of ammonium sulfate preferably about 15% or with mother liquor from the second crystallization of alum. The solution is cooled to crystallize out a more highly purified form of ammonium alum. The crystals are then recovered in washed form in a normal liquid-solid separation step.

This aluminum recovery step may precede or follow the uranium recovery procedure. Generally aluminum is removed from the extract phase and then the liquor obtained as filtrate from the first alum crystallization operation or equivalent composition solutions are processed to recover uranium, phosphorous, sulfate, ammonia, iron, etc.

Uranium may be recovered by any one of several methods. Preferably the uranium is removed from solution by solvent extraction. Extract is first subjected to a reduction reaction either by electrolytic means or by chemical reaction as by treatment of the extract with reducing agents particularly those which do not introduce metal ions detrimental to the specification of the final products. Iron and aluminum are commonly used for this purpose with powdered iron being preferred. However, use of aluminum may simplify the operation inasmuch as the reduction of the extract may be carried out prior to removal of aluminum from solution, thus any increase in aluminum in solution will not alter the ratio of components in solution inasmuch as the aluminum added may be removed in the next operation when the $Al_2O_3$ content is precipitated as ammonium alum. If the addition agent is in powdered form the slurry after several minutes is subjected to a liquid-solid separation to remove the unreacted and insoluble metal therefrom. This may be accomplished through the use of a filter, centrifuge, cyclone or other suitable separation device. Between .1 gram and about 8 grams of powdered iron, preferably about 2 grams, are added to about 100 ml. of the solution resulting from the alum crystallization. After removal of the unreacted iron the reduced aqueous solution is intimately contacted or otherwise mixed under agitating conditions with an organic solvent having an affinity for uranium. This organic solvent is generally made up of two components, the effective extractant agent and the vehicle or extender. The extractant may be one or more of the ortho and/or pyro phosphoric acid esters of the alkyl monohydric alcohols. Both the mono and di esters as well as mixtures of the two are useful. The butyl, isobutyl, amyl, hexyl, heptyl, n-octyl, iso-octyl, etc., esters of the phosphoric acid are satisfactory for the purpose but either the octyl or hexyl alcohol esters and/or di esters are preferred. It is, of course, to be understood that other extractants which are relatively immiscible with the aqueous phase and having uranium removal characteristics are likewise satisfactory. The extender or vehicle may be any one or more of the normal organic solvents such as benzene, naptha, mineral spirits, carbon tetrachloride, trichlorethylene, xylenes and the like. Since the esters are extractants having a limited solubility in water, before recycling to the extract system, the aqueous medium is normally scrubbed with a suitable solvent such as kerosene or trichlorethylene to reduce the ester content of the aqueous medium. Concentration of extractant in the extender or vehicle may vary over wide limits up to about 100% but is preferably maintained between about 2.5 and about 15%. Volume ratios of aqueous phase to organic phase in the time of contact may vary for example from about 1 to 1 to about 40 to 1 and preferably is maintained within the range of 5 to 1 to about 15 to 1. The preferred temperature for contacting of the phases is in the range between about room temperature and about 60° C. with operations preferably being carried out at about 35 to 40° C. After agitation of the two phases for about a minute, although longer times may be used, the aqueous phase is separated from the organic phase in a multistage operation which will have taken up about 97% of the uranium values originally present in the aqueous phase. The organic phase is next stripped of its uranium content and the organic solvent returned to the extraction system. The organic phase may be treated directly with aqueous hydrofluoric acid or other suitable precipitating agent or may be treated directly with mixtures of phosphoric acid and hydrofluoric acid, the latter being the preferred procedure. After treatment with precipitating agents either batchwise with agitation or in a continuous counter-current washing system, the precipitated material together with an aqueous phase is separated from lean organic phase which organic is then recycled to the extraction system. In all such precipitation by means of hydrofluoric acid between about 5 and about 10 molar excess of hydrofluoric acid over that required to produce $UF_4$ is preferred. The aqueous phase acid solution after adjustment of its hydrofluoric acid content is then recycled in the system according to the dictates of good engineering practice.

Other alternative procedures which may be utilized for recovery of uranium are ion exchange treatment, differential precipitation or precipitation by specific precipitate. For ion exchange operations there are available a number of base type anion exchange resins such as Permutit A–300. In such operations the solution is fed to the bed at a rate of about .5 to about 2 gallons per square foot of Permutit, following which a saturated bed is eluted of its uranyl complex by treatment with hydrochloric acid.

Following the removal of the uranium by the preferred procedure heretofore described the resulting liquor containing phosphorous, aluminum, iron, nitrogen, sulfur and other values which are present in solution in a number of combinations such as ammonium sulfate, $H_2SO_4$, aluminum sulfate, iron sulfate and the $P_2O_5$ values such as phosphoric acid are combined with the metal or cation values as mentioned above, is neutralized with oxygen containing basic alkaline earth metal compounds, or preferably with ammonium hydroxide and/or ammonia gases or others which form substantially water-soluble sulfates to decrease the acidity of said solution and to give a precipitation of the insoluble values present, i. e., aluminum phosphate, iron phosphate and the like. It has been found that somewhat selective precipitation of aluminum, iron and uranium values can be effected if step-wise precipitation is employed. This step-wise precipitation if the solution has been previously reduced with materials such as iron may be accomplished by neutralizing the solution to a pH of about 3.5, separating the solids therein produced and then further neutralizing the solution to a pH of about 7. The first precipitation under these conditions gives a solid product containing aluminum and small percentages of iron values. The second precipitation normally contains iron and smaller quantities of aluminum and very small quantities of uranium values. After removal of solids formed and upon further washing and/or processing, these precipitates may be treated in separate operations, or in the case of high aluminum-low iron precipitate, recycled to the liquor prior to alum crystallization for recovery of values therein by the procedure heretofore described. The exact conditions required to give a somewhat complete separation of the aluminum and iron values is dependent upon the oxidation state of the liquor processed. In such operations the higher the pH and particularly if the pH values are above 9, say of the order of 10.5, the resulting slurry is more easily filtered or centrifuged.

After removal of the aluminum and iron precipitate formed the liquor resulting, depending upon the $P_2O_5$ and ammonia concentration, may be processed to recover ammonium phosphate values. In one embodiment of the procedure the solution is evaporated prior to ammonia addition and removal of iron and aluminum. Evaporation is carried to a $P_2O_5$ concentration which will permit the direct removal of tri-ammonium or other ammonium phosphates. When such precipitation is effected upon cooling of the solution tri-ammonium or other ammonium phosphates are directly crystallized to give substantially complete removal of $P_2O_5$ values with only traces of ammonium sulfate in the precipitate. Preferably therefore the solution after uranium extraction is evaporated in conventional evaporation equipment such as submerged combustion, multiple effect evaporators and the like to about .6 of its original volume and cooled in heat exchangers or equivalent apparatus to a temperature between about 30° C. and about 70° C. preferably to about 50° C. and continuously added to liquor in gas tight absorption type reaction tanks where with constant mixing there is added ammonia to maintain a pH of approximately 9. Slurry from the reactors is centrifuged or otherwise treated to remove iron and aluminum phosphates and the liquid cooled to crystallize ammonium phosphates.

Alternatively the liquor after removal of ammonium alum may be adjusted to a pH between about 5.5 and about 7, subjected to a solid-liquid separation for removal of precipitated values and the resulting solution evaporated and crystallized at about 80° C. These crystals of ammonium sulfate are removed normally by centrifuging. The resulting liquor has a small amount of water added thereto and is then cooled to some lower temperature normally about 30° C. to remove ammonium phosphate mixed with some ammonium sulfate impurity. After removal of these solids the end liquor is cycled to solution prior to evaporation of pH 7 liquor. The ammonium sulfate and the ammonium phosphate-ammonium sulfate product may be purified by subsequent crystallization or simply dried.

Tri-ammonium phosphate recovered by the preferred modification of the process preferably is dried with indirectly fired dryers to volatilize the water and a portion of the ammonia which is present. Gases removed from this operation are cooled and the ammonia recovered therefrom by using the conventional ammonia absorption and stripping equipment and operations. The product resulting comprises essentially mono-ammonium orthophosphate if drying temperatures of less than about 150° C. are used.

Ammonium sulfate crystals not recovered as described may be recycled directly or decomposed partially or completely into ammonia and ammonium acid sulfate or into its component parts in order to best utilize the ammonium sulfate as a raw material in the overall operation.

The invention will be more fully understood from the following example:

*Example*

A representative leached zone feed assaying 15.2% $P_2O_5$, 23.2% $Al_2O_3$, 2.7% $Fe_2O_3$ and 9.1% CaO was heated until dry. 100 parts by weight of this dry solid material was treated with 258 parts by weight of ammonium acid sulfate as follows: The ammonium acid sulfate was heated to fusion at a temperature of about 250° C. and the leached zone solids added thereto. The mixture was maintained at 250° C. for approximately two hours. The resulting mass was cooled and leached counter-currently with water to recover solubilized constituents and the insoluble cake discarded.

The above fused material when extracted countercurrently produces a filtrate in the volume of approximately 22 gallons of solution per each 100 pounds of dry leached zone solids reacted. An average filtrate or extract has a specific gravity about 1.3. Overall recoveries in the digester and leaching circuits were about 86% $Al_2O_3$, 77% $P_2O_5$ and about 95% $U_3O_8$, 80% $Fe_2O_3$. Upon cooling the filtrate to approximately 25° C. about 150 pounds of crude alum crystals were separated from each approximately 22 gallons of filtrate.

The extract after ammonium alum removal contained predominantly $P_2O_5$, sulfate and ammonium ions with minor quantities of $Fe_2O_3$ and $Al_2O_3$.

The wet crystals of ammonium alum from the primary crystallization may be redissolved with approximately 3 pounds of a 20% ammonium sulfate solution at 70° C. per each pound of crude alum crystals. Upon slow cooling at a rate of about 2° per hour to a temperature of approximately 25° C. a purified ammonium alum is crystallized from solution. This crystallized and purified ammonium alum is then filtered and the solids therefrom may be repeatedly processed for improved purity.

The wet crystals of ammonium alum may be treated with two times the theoretical amount of 20% ammonium hydroxide to combine with all of the aluminum sulfate components of the ammonium alum to make ammonium sulfate. Rapid filtering hydrated aluminum is separated from the reaction mass, preferably in a counter-current leaching system wherein approximately 180 pounds of water is used to extract the ammonium sulfate.

The solution from the primary crystallization or after alum removal is subjected to contact with about ½ pound of powdered metallic iron per each 10 gallons of solution and agitated for about 30 minutes, after which the solids are filtered from the liquid. This liquid is then intimately contacted with approximately 1 gallon of an organic solvent composed of 9 parts by volume of kerosene and 1 part by volume of a mixture of mono and di esters of ortho and pyro phosphoric acids of iso-octyl alcohol in a 5 stage countercurrent liquid-liquid extraction system per 10 gallons of reduced solution. This intimate contact was maintained for one to two minutes in each of the successive stages and the extractant may be separated from the last aqueous phase. This aqueous phase may then be processed to recover the $P_2O_5$ and other values.

The uranium containing organic solid may then be treated in a ratio of approximately 1 gallon of 50% aqueous hydrofluoric acid to 1 gallon of organic solvent. The aqueous phase containing the uranium precipitate is removed and the uranium tetrafluoride filtered from solution. About 0.015 pound of uranium tetrafluoride cake of about 45% uranium content may be recovered from 100 pounds of solution. The aqueous hydrofluoric filtrate may be recycled to the precipitation step after first introducing additional gaseous hydrofluoric acid into it to restore its strength to 50% hydrofluoric acid.

Aqueous phase from the uranium extracting operation may then be adjusted to a pH of 7 and filtered. Approximately 18 pounds of 28% ammonium hydroxide is required per 100 pounds of liquor from the uranium recovery. The filtered solids are washed completely and the precipitated material by assay contains about 15% $Al_2O_3$, 25% $Fe_2O_3$ and about 42% $P_2O_5$ on a dry basis. The resulting liquor is evaporated to .6 of its original volume, neutralized with additional ammonium hydroxide to a pH of about 10 while maintaining a temperature of about 60° C. in a pressurized system. This liquid is then cooled to about 25° C. and about 80% of the contained phosphatic values precipitate as tri ammonium phosphate. This solid is removed by centrifuging and dried at about 150° C. to volatilize ammonia and to produce a product assaying about 22% ammonia and 56% total $P_2O_5$ and about 55% water soluble $P_2O_5$, substantially as a mixture of mono and di ammonium phosphate.

Liquor from the removal of the tri ammonium phosphate is then evaporated to recover the contained free ammonia and to crystallize approximately 80% of the ammonium sulfate contained therein. Preferably this evaporation is carried out at 80° C. After removal of the ammonium sulfate the mother liquor containing $P_2O_5$ is cycled to the liquor after pH 7 adjustment heretofore described.

I claim:

1. A process for recovering mineral values from leached zone materials from the Florida pebble phosphate overburden which comprises reacting the leached zone material with at least 100% greater than the stoichiometric equivalent amount of molten acid sulfate of ammonia, leaching the reacted mixture with an aqueous medium, separating the insoluble material from the reaction products soluble in aqueous medium, removing a major portion of the aluminum from the aqueous solution as ammonium alum crystals and thereafter recovering from the solution mineral values selected from the group consisting of uranium and phosphorus.

2. A process for recovering mineral values from leached zone materials from the Florida pebble phosphate overburden which comprises reacting the leached zone material with at least 100% greater than stoichiometric equivalent amount and up to 300% excess ammonium acid sulfate over the amount required to react with all of the constituents of the material capable of reacting with acid sulfate at a temperature in the range between about 350° F. and about 900° F., leaching the reacted mixture with an aqueous medium, separating the insoluble material from aqueous solution of reaction products, removing a major portion of the aluminum from the aqueous solution as ammonium alum crystals and thereafter recovering from the solution mineral values selected from the group consisting of uranium and phosphorus.

3. A process for recovering mineral values from leached zone materials from the Florida pebble phosphate overburden which comprises reacting the leached zone material of a particle size smaller than about 150 mesh with ammonium acid sulfate in quantities at least 100% greater than the stoichiometric equivalent amount up to 300% excess acid sulfate over the amount required to react with all of the constituents of the material capable of reacting with acid sulfate while maintaining the acid sulfate molten at a temperature between about 350° F. and about 900° F. for between about one and about ten hours, cooling the reacted mixture, leaching the cooled material with an aqueous medium, separating insoluble material from the reaction products soluble in aqueous medium, crystallizing from the aqueous solution a major portion of the aluminum as ammonium alum crystals, and thereafter separately recovering from the solution mineral values selected from the group consisting of phosphorus and uranium.

4. A process for recovering mineral values from leached zone materials from the Florida pebble phosphate overburden which comprises reacting leached zone material with ammonium acid sulfate in amounts between 100% and 300% excess acid sulfate over the amount required to react with all of the constituents of the material capable of reacting with acid sulfate while maintaining a temperature between about 350° F. and about 900° F., leaching the reacted mixture with an aqueous medium to produce a solution having a specific gravity of between about 1.2 and about 1.5, separating insoluble materials from the reaction products soluble in the aqueous medium, adjusting the ammonium sulfate content and the temperature to crystallize amomnium alum from the resultant solution, solvent extracting the resultant solution with an alkyl phosphoric acid ester, and recovering the uranium values from the rich alkyl phosphoric acid ester solution.

5. A process for recovering mineral values from leached zone materials from the Florida pebble phosphate overburden which comprises reacting leached zone material with ammonium acid sulfate in amounts up to about 300% excess acid sulfate over the amount required to react with all of the constituents of the material capable of reacting with acid sulfate while maintaining a temperature between about 350° F. and about 900° F., leaching the reacted mixture with an aqueous medium to produce a solution having a specific gravity of between about 1.2 and about 1.5, separating insoluble materials from the reaction product soluble in the aqueous medium, adjusting the ammonium sulfate content and the temperature to crystallize ammonium alum from the resultant solution, removing the ammonium alum crystals from the resultant solution, solvent extracting the resultant solution with an alkyl phosphoric acid ester, treating the uranium rich ester phase with hydrofluoric acid, separating the precipitated $UF_4$ material and washing and drying the same.

6. A process for recovering mineral values from leached zone materials from the Florida pebble phosphate overburden which comprises reacting leached zone material of a particle size smaller than about 150 mesh with molten ammonium acid sulfate, cooling the mixture, leaching the cooled mixture with an aqueous medium, separating insoluble material from the solution, adjusting the sulfate content and the temperature of the solution to crystallize out ammonium alum crystals, removing the ammonium alum crystals formed from the solution, subjecting the solution to the action of a reducing agent, solvent extracting the resultant liquid with an alkyl phosphoric acid ester, and recovering the uranium values dissolved in the phosphoric acid ester.

7. A process for recovering mineral values from leached zone materials from the Florida pebble phosphate overburden which comprises reacting leached zone material of a particle size smaller than about 150 mesh with molten ammonium acid sulfate, cooling the acid mixture, leaching the acid mixture with an aqueous medium, separating insoluble materials from the solution, adjusting the sulfate content and the temperature of the solution to crystallize out ammonium alum, separating the ammonium alum crystals from the solution, adjusting the pH of the filtrate to between about 2.5 and about 11 to precipitate values step-wise and separately recovering the aluminum, iron and uranium values from these precipitates.

8. A process for recovering mineral values from leached zone materials from the Florida pebble phosphate overburden which comprises reacting leached zone material of a particle size smaller than about 150 mesh with molten ammonium acid sulfate, cooling the acid mixture, leaching the acid mixture with aqueous medium, separating insoluble material from the solution, adjusting the sulfate content and the temperature of the solution to crystallize ammonium alum, separating the ammonium alum crystals from the leached solution, solvent extracting the resultant liquid with an alkyl phosphoric acid ester, adjusting the pH of the resultant liquid to about 3.5 for precipitation of aluminum values, removing the precipitate from the solution, adjusting the pH of the filtrate further to about 7 for precipitation of the iron values and recovering the iron values from the solution.

9. A process for recovering mineral values from leached zone materials from the Florida pebble phosphate overburden which comprises reacting leached zone material of a particle size smaller than about 150 mesh with molten ammonium acid sulfate, cooling the acid mixture, leaching the acid mixture with an aqueous medium, separating insoluble materials from the solution, concentrating the solution to about .6 of its original volume, treating the concentrated solution with sulfate of ammonia to crystallize ammonium alum sulfate, extracting the resultant liquid with an alkyl phosphoric acid ester to remove uranium, evaporating the resultant solution to about .6 of its original volume, cooling the solution to between about 30° C. and about 70° C. while adding ammonia to maintain a pH of about 9, removing the iron and aluminum phosphates precipitated from the solution during the ammoniation and cooling the concentrate to crystallize ammonium phosphates from solution and separating the ammonium phosphates from the resultant liquid.

10. The process for recovering mineral values from leached zone materials from the Florida pebble phosphate overburden which comprises reacting leached zone feed material with ammonium acid sulfate in the ratio of 100 parts by weight of dry solids to 258 parts by weight of ammonium acid sulfate and at a temperature of about 550° C. cooling the reacted mixture, counter-currently leaching the cooled reacted mixture with water to produce approximately 22 gallons of solution per 100 pounds of dry solids reacted, separating insoluble solids from the filtrate, cooling the filtrate to approximately 25° C., separating the crude alum crystallized upon cooling, dissolving the crude alum in 20% ammonium sulfate solution at about 70° C. slowly cooling the solution to approximately 25° C., separating the purified ammonium alum solution, introducing into the resultant solution after crude alum removal about ½ pound of powdered metallic iron per each 10 gallons of solution, agitating the mixture for about 30 minutes, filtering off the solids from the reduced solution, contacting the reduced solution with organic solvent in the ratio of 5 gallons of reduced solution per gallon of solvent consisting of 9 parts by volume of kerosene and 1 part by volume of a mixture of mono and diesters of ortho and pyrophosphoric acid esters of iso-octyl alcohol, separating the aqueous and organic phases, precipitating the $UF_4$ by treatment of the organic phase with hydrofluoric acid, adjusting the pH of the aqueous phase at about 7, removing the precipitate from the aqueous liquor, evaporating the aqueous liquor to about .6 of its original volume, neutralizing the solution to a pH of about 10 while maintaining a solution temperature of about 60° C., cooling the concentrated solution to about 25° C. to precipitate tri-ammonium phosphate, separating the precipitate, heating the precipitate to about 150° C. to volatilize ammonia, evaporating the solution produced after precipitation of tri-ammonium phosphate, removing the ammonium sulfate precipitated and recycling the liquid to the aqueous phase having a pH of about 7.

References Cited in the file of this patent
UNITED STATES PATENTS

| | | |
|---|---|---|
| 1,251,742 | Blumenberg | Jan. 1, 1918 |
| 1,638,677 | Blumenberg | Aug. 9, 1927 |
| 1,752,599 | Kjellgren | Apr. 1, 1930 |